July 16, 1929.  G. E. GRAU  1,721,079
MEANS FOR STARTING THE MOTORS OF MULTIMOTOR DRIVES
Filed Dec. 30, 1926
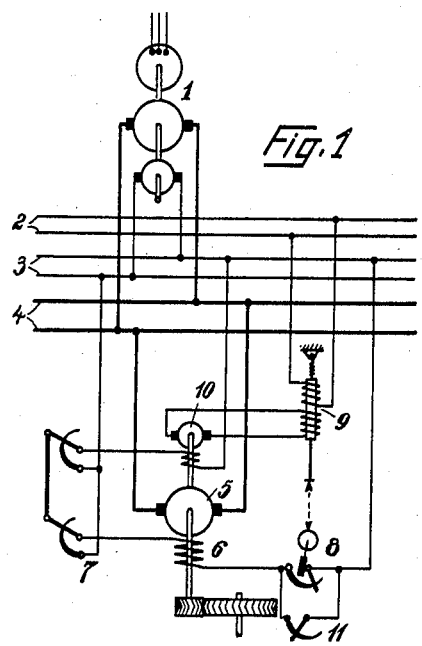
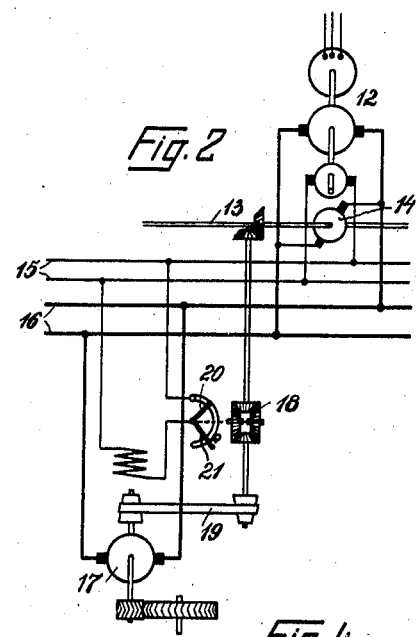
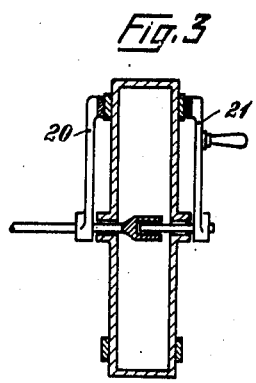
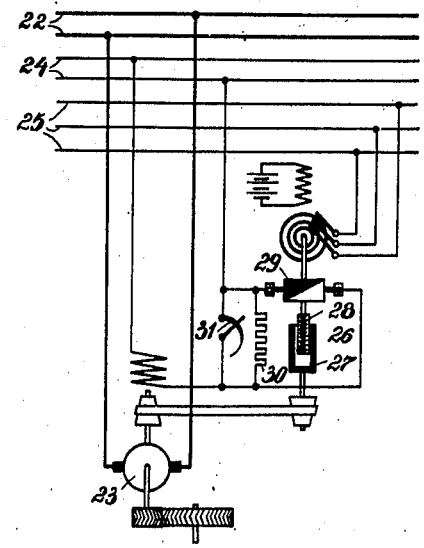

Patented July 16, 1929.

1,721,079

UNITED STATES PATENT OFFICE.

GEORG ERNST GRAU, OF BERLIN-CHARLOTTENBURG, GERMANY, ASSIGNOR TO SIEMENS-SCHUCKERTWERKE GESELLSCHAFT MIT BESCHRANKTER HAFTUNG, OF BERLIN-SIEMENSSTADT, GERMANY, A CORPORATION OF GERMANY.

MEANS FOR STARTING THE MOTORS OF MULTIMOTOR DRIVES.

Application filed December 30, 1926, Serial No. 157,962, and in Germany January 6, 1926.

My invention relates to means for starting the motors of multi-motor drives, more particularly of paper-making or similar machines with individual drives in which the speed ratio between the individual motors is maintained by automatic regulating devices, which are controlled on the one hand by a value dependent on the normal speed and on the other hand by a value dependent on the motor speed (voltage of a tachometer dynamo, speed of a part of an electrical or mechanical differential gearing or the like), and which in their turn control the field excitation of the individual motors. In these drives certain drawbacks arise when starting the motors, such as for example, that the regulating device weakens the motor field during the start or that the regulating lever moves continuously during the starting, so that special provisions have to be made to bring it to rest upon the corresponding contact of the contact path when the normal speed has been attained.

The object of my invention is to enable a simple starting of the motors of such drives. With this object in view an auxiliary manually operated regulating device is connected permanently in parallel relation to the field regulator which automatically controls the motor speed.

During the starting period the influence of the automatic field regulator on the motor speed is first entirely or partly neutralized by the auxiliary regulating device, the motor being started, for instance by first short-circuiting or nearly short-circuiting the resistance located in the field excitation circuit, whereafter the action of the automatic regulator is gradually restored to its full extent by an adjustment of the auxiliary regulating device. When the field resistance adjusted by the auxiliary regulating device is so high or has become so high that the speed of the motor under its action alone would be higher than that which corresponds with the standard or normal speed, the automatically controlled field regulator takes full charge and places itself automatically in such a position that the motor assumes the speed corresponding with the standard speed. Now the manually operated auxiliary regulating device is gradually moved forward in the direction of increasing the resistance. The automatically controlled field regulator thereby places itself automatically always in such a position that the speed of the motor corresponds with the leading speed. This is continued until the circuit of the auxiliary regulating device is completely opened, whereupon the automatic field regulator alone takes over the regulation.

The auxiliary regulating device may consist of a variable resistor of suitable size which, for instance by means of a regulating lever sliding along its contact path, is adapted to be completely or partially short-circuited, adjusted and opened. It may, however, consist of a regulating lever adapted to be adjusted by hand which slides along a contact path of an automatically controlled regulator. This contact path may be the same as the one upon which the regulator lever slides, but it may also be a separate contact path to the individual contacts of which the regulating resistor is connected in any suitable manner. In any case the arrangement must be such that the movement of one regulating lever is not hindered by the other.

In the drawings affixed hereto some embodiments of my invention are illustrated by way of example. The drawings show in Fig. 1, a diagrammatic representation of a drive in which the regulating device weakens the motor field during the start as much as possible, Fig. 2, a diagram of a drive in which the regulating lever rotates continuously during the starting, Fig. 3, a detail of the regulating device in sectional elevation, and Fig. 4, a diagram of a drive in which a differential device is employed.

Referring to Fig. 1 of the drawings, 1 is the control set, 2 the normal voltage line, 3 the exciter line, 4 the power line, 5 one of the working motors to be regulated, the field 6 of which is controlled by a field regulator 7 adjustable by hand and acting as torque regulator, and controlled also by an automatic regulator 8. Upon the automatic regulator 8 acts the electro-magnetic differential relay 9, which is controlled on the one hand by the normal voltage and on the other by a tachometer dynamo 10 driven by the working motor 5. According to my invention a manually adjustable regulating resistor 11 is connected in shunt to the automatic regulator 8. This resistor is at the commencement of the starting short-circuited in the manner described or adjusted for a value which corresponds exactly with the normal speed or a slightly higher one and which is gradually increased as desired. At the end of the starting the circuit of this auxiliary regulator may be completely opened.

Referring to Fig. 2 of the drawing, 12 is the control set, 13 the pilot shaft driven by the pilot motor 14, 15 the exciter line, 16 the power line connected to the armatures of the working motors, one of said armatures being shown at 17. 18 is a differential gearing which is controlled on the one hand by the speed of the pilot shaft 13 and on the other hand through the conical pulley belt drive 19, operating as torque regulator, by the speed of the working motor. The differential gearing is connected with the regulator lever 20 of a field regulating switch connected in the exciter circuit of the working motor. 21 is the auxiliary device according to my invention connected in parallel to this field regulator. It consists, as shown on a larger scale in Fig. 3 of a regulator lever 21 adjustable by hand and rotatable around the same geometrical axis as the automatically controlled regulator lever 20 and being electrically connected to it, as shown for instance at 11 in Figure 1. The regulator lever slides in this case, see in particular Fig. 3, along a special contact path which is provided on one side of the resistor casing, while the contact path of the automatically controlled regulator arm connected with it electrically in parallel relation is located on the opposite side of the resistor casing. Each of the two regulator levers is thus able to move independent of the other.

It is immaterial for my invention whether the differential device is a mechanical one of the kind shown in the drawing or of any other (for instance an epicyclic gearing) or whether it is an electrical differential relay of any suitable kind (a double feed induction machine or a tachometer dynamo with rotating stator or rotor). My invention is equally well applicable to the drives in which a resistor connected in the exciter circuit of the field winding of the working motor is temporarily short circuited, the duration of the short circuit and the cutting in of this resistor being determined by a differential device (for instance a contact drum longitudinally movable in conjunction with a nut driven by the working motor together with a screw-threaded stud driven by the normal speed) controlled on the one hand by the normal speed and on the other hand by the motor speed.

Such an arrangement is illustrated by way of example in Fig. 4 of the drawing. In this figure 22 is the power line from which the armature 23 of the working motor shown is supplied, 24 is the exciter line, 25 the synchronizing line, 26 is the differential gearing consisting of a nut 27 driven by the working motor and incapable of movement in the longitudinal direction and 28 a screw-threaded spindle 28 cooperating with the nut 27. This spindle is driven at normal speed from synchronizing line 25 and displaceable in longitudinal direction. Upon the shaft of this spindle is fixed the contact drum 29 so that it rotates with the spindle and moves as well with it in an axial direction if the speed of the nut driven by the motor 23 is different from the speed of the spindle which is determined by the normal speed. This contact drum is connected with its brushes in circuit with the exciter winding of working motor 23. In shunt to the contact device 29 is connected the resistor 30. The duration of the short-circuit effected by the contact drum 29 and the switching in of the said resistor depends upon the axial position of the contact drum so that by means of this device the speed of the motor can be determined in relation to the normal speed. According to my invention a manually adjustable auxiliary regulator 31 is connected in shunt to this automatically controlled resistor 30. This auxiliary regulator is, as in the previously described drives, short circuited at the commencement of the start or adjusted for a suitable value and its resistance is gradually increased in any suitable manner, while the voltage applied to the armature of the working motor is increased or after the voltage has been brought to its full value.

Various modifications and changes may be made without departing from the spirit and the scope of the invention, and I desire, therefore, that only such limitations shall be placed thereon as are imposed by the prior art.

I claim as my invention:

1. Means for starting the motors of multi-motor drives, particularly for individual drive paper machines or the like, comprising in combination with automatic regulating devices for maintaining the speed ratios between the individual motors acting upon the field excitation of the individual motor and being responsive in their action to a differential value between a standard speed and the actual motor speed, an auxiliary regulator having a suitable resistor connected permanently in shunt to said automatic field regulating device, and a hand operated contact device for completely or almost completely short circuiting, varying and opening the circuit of said auxiliary regulator.

2. Means for starting the motors of multi-motor drives, particularly for individual drive paper machines or the like, comprising in combination with an individual field excitation resistance for each motor and an automatic regulating device therefor for maintaining the proper speed ratios between the individual motors, each device being responsive in its action to a differential value between a standard speed and the actual motor speed which it controls, an auxiliary hand operated regulating device permanently connected in shunt with each automatic field regulator for separately controlling the value of the field resistance of its automatic regulator from short circuit or almost short circuit to the full value which the automatic regulator may happen to have independently adjusted at the time.

In testimony whereof I affix my signature.

G. ERNST GRAU.